United States Patent
Dippold et al.

(10) Patent No.: US 9,162,615 B2
(45) Date of Patent: Oct. 20, 2015

(54) DIRECTION INDICATOR CIRCUIT FOR CONTROLLING A DIRECTION INDICATOR IN A VEHICLE

(71) Applicant: Infineon Technologies AG, Neubiberg (DE)

(72) Inventors: Gebhart Dippold, Finkenstein (AT); Robert Illing, Villach (AT); Alexander Mayer, Treffen (AT); Albino Pidutti, Martignacco (IT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/034,604

(22) Filed: Sep. 24, 2013

(65) Prior Publication Data

US 2014/0085074 A1    Mar. 27, 2014

(30) Foreign Application Priority Data

Sep. 25, 2012  (DE) .......................... 10 2012 018 927

(51) Int. Cl.
*B60Q 1/34* (2006.01)
*B60Q 1/38* (2006.01)

(52) U.S. Cl.
CPC . *B60Q 1/34* (2013.01); *B60Q 1/382* (2013.01)

(58) Field of Classification Search
CPC ....................................................... B60Q 1/34
USPC .................... 340/463, 468, 475; 315/77, 287; 327/419; 361/78, 79, 86; 323/282
See application file for complete search history.

(56) References Cited

U.S. PATENT DOCUMENTS

| | | | |
|---|---|---|---|
| 4,291,302 A | | 9/1981 | King et al. |
| 4,683,416 A | * | 7/1987 | Bynum .......................... 323/314 |
| 5,061,863 A | * | 10/1991 | Mori et al. ...................... 327/50 |
| 5,247,280 A | * | 9/1993 | Brooks .......................... 340/458 |
| 5,444,595 A | * | 8/1995 | Ishikawa et al. ................. 361/86 |
| 5,910,737 A | * | 6/1999 | Kesler .............................. 327/89 |
| 6,466,081 B1 | * | 10/2002 | Eker .............................. 327/541 |
| 6,700,432 B2 | | 3/2004 | Misdom et al. |

FOREIGN PATENT DOCUMENTS

| | | |
|---|---|---|
| DE | 2425410 A1 | 11/1975 |
| DE | 2507005 A1 | 9/1976 |
| DE | 4224586 A1 | 1/1994 |
| DE | 60129778 T2 | 6/2008 |
| GB | 1463466 A | 2/1977 |

OTHER PUBLICATIONS

English abstract of DE 4224586 A1 dated Jan. 27, 1994.

* cited by examiner

*Primary Examiner* — Brent Swarthout

(57) ABSTRACT

A direction indicator circuit for controlling a direction indicator may include: a first terminal for connecting to a supply voltage terminal; a second terminal for connecting to a direction indicator switch and a lighting means; a third terminal for connecting to a capacitor; wherein the direction indicator circuit is designed to provide the lighting means with a current during an on state and with no current during an off state, wherein the duration of the on state and the duration of the off state are determined by a voltage at the capacitor; wherein the direction indicator circuit has a first and a second circuit, wherein the capacitor provides the supply voltage for the first and second circuits during the on state; wherein the current which flows through the first circuit has a negative temperature coefficient, and the current which flows through the second circuit has a positive temperature coefficient.

4 Claims, 7 Drawing Sheets

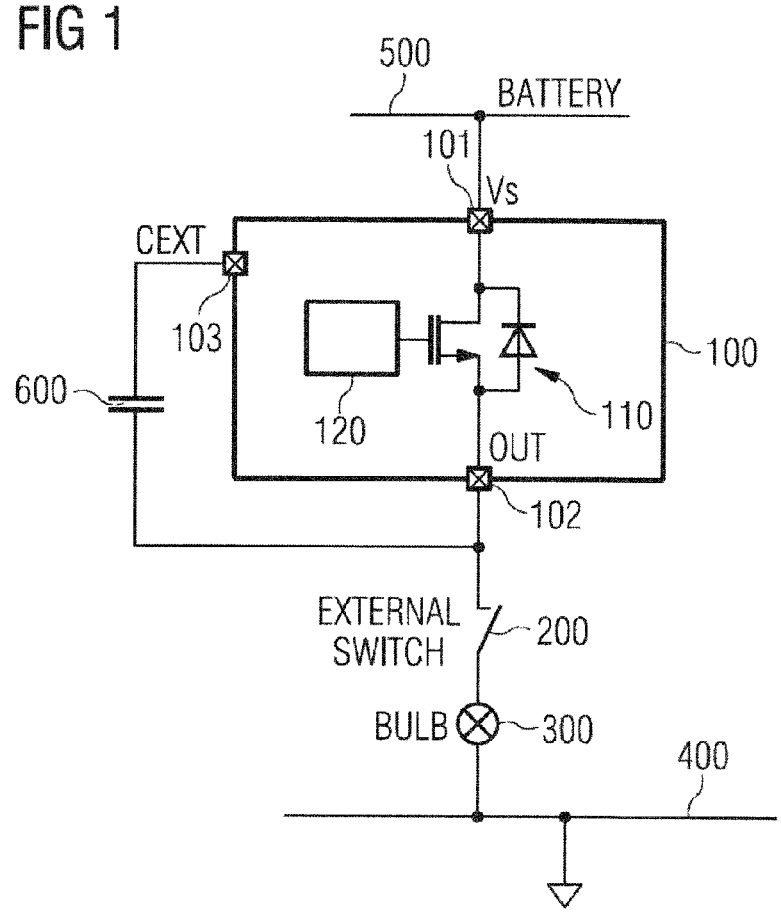

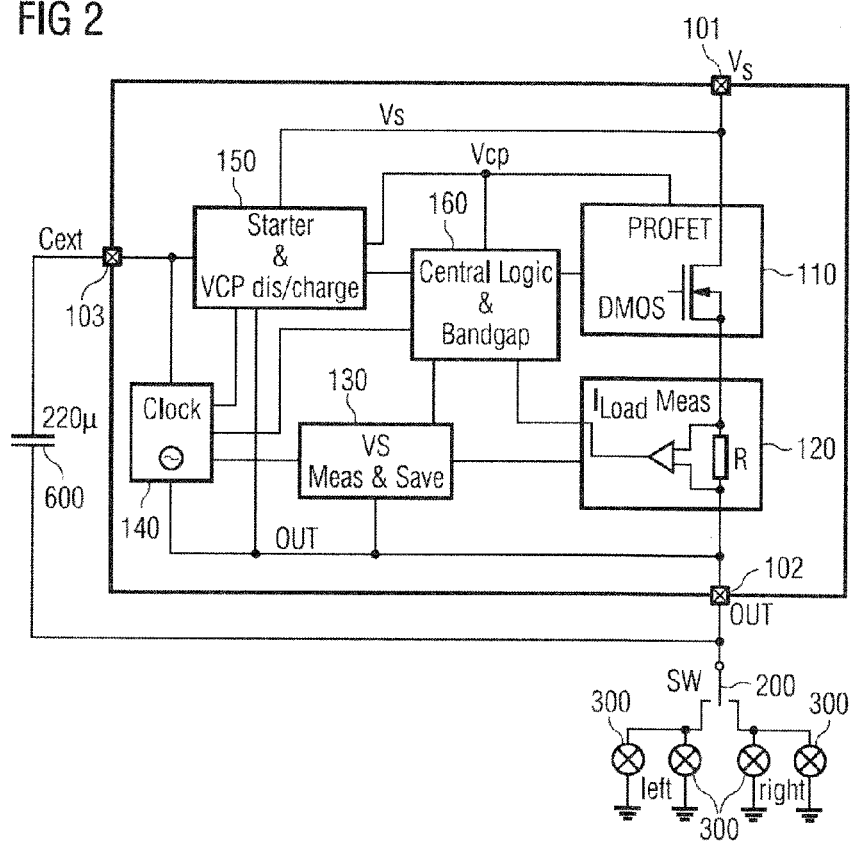

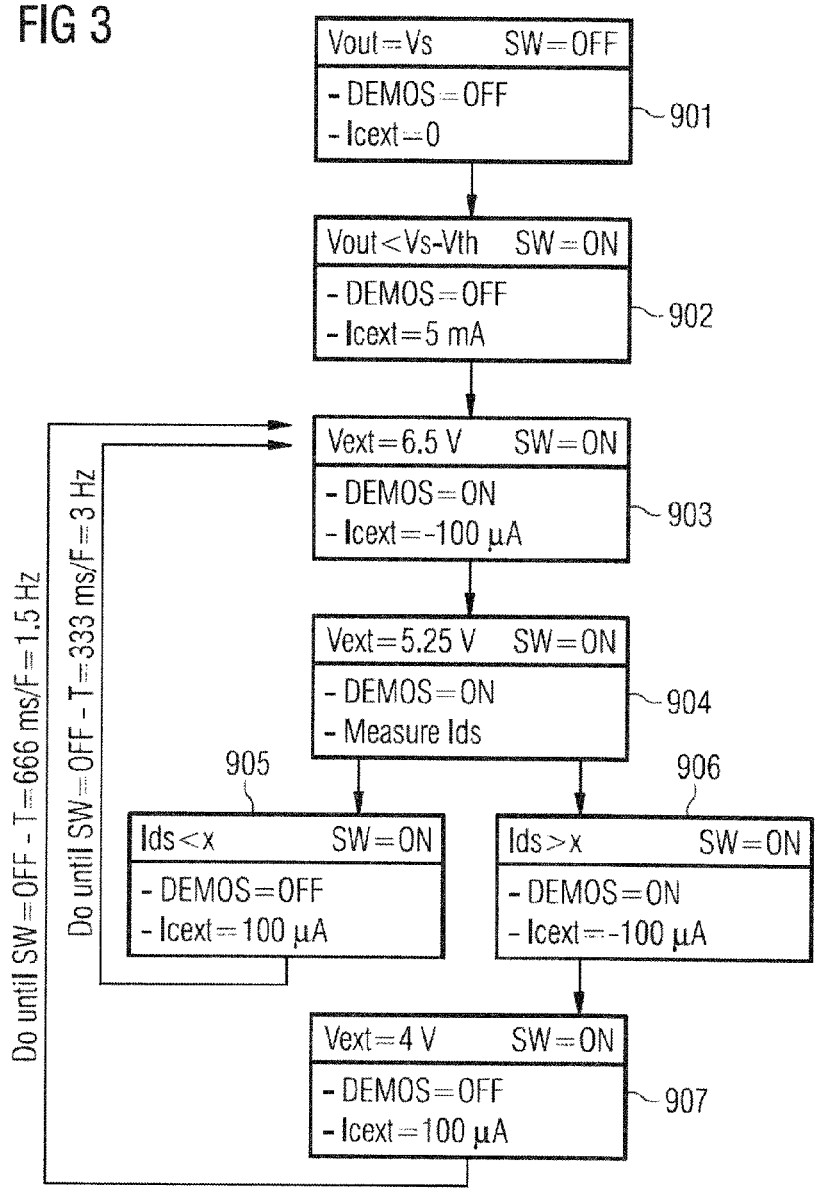

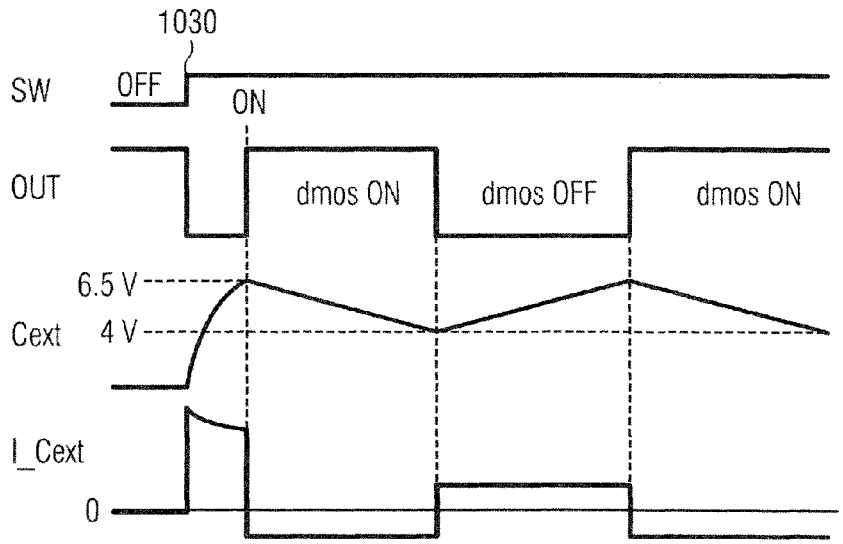
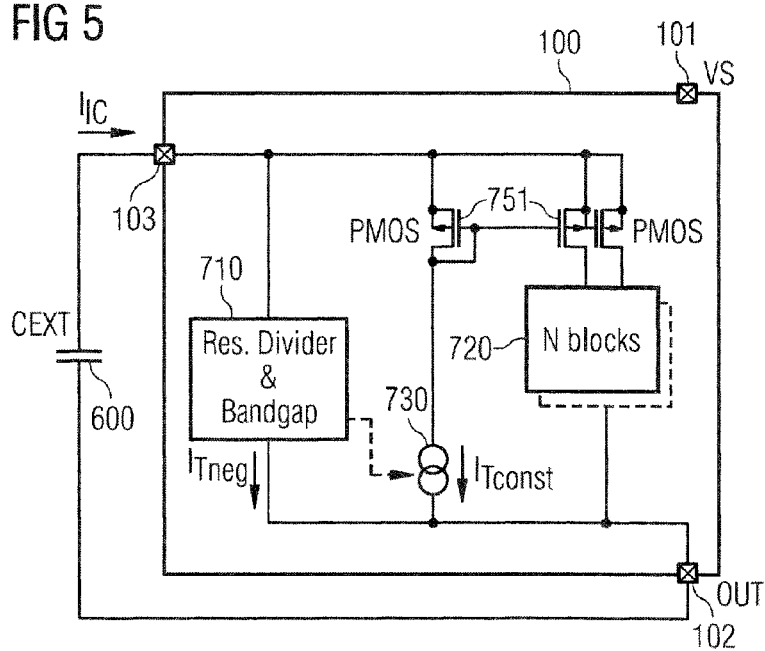

DIRECTION INDICATOR CIRCUIT FOR CONTROLLING A DIRECTION INDICATOR IN A VEHICLE

CROSS-REFERENCE TO RELATED APPLICATION

This application claims priority to German Patent Application Serial No. 1020120189273, which was filed Sep. 25, 2012, and is incorporated herein by reference in its entirety.

TECHNICAL FIELD

Various embodiments relate to a direction indicator circuit for actuating a direction indicator in a vehicle.

BACKGROUND

Indicators for the direction of travel, referred to as direction indicators, are required for applications in vehicles. A direction indicator has the function of using a lighting means to indicate to other road users if the road user wishes to change the direction of travel. Direction indicators have been implemented electromechanically, efforts being made to replace these electromechanical solutions by more economical electronic ones. A contemporary direction indicator is composed of a direction indicator circuit, a direction indicator switch and a plurality of lighting means, for example incandescent lamps. Since an electronic solution is intended to replace an established electromechanical solution, value is placed on a direction indicator circuit which is as economical as possible and on an overall solution which is an economical as possible. The direction indictor circuit, the direction indictor switch and the lighting means are connected in series between the supply voltage and the vehicle ground or a ground terminal of the vehicle. If the direction indicator switch is closed, the lighting means is to flash with a defined frequency, that is to say light up or not light up periodically. The frequency is defined as 1.5 Hz or 3 Hz, wherein the frequency of 3 Hz indicates a fault in a lighting means.

Direction indictor circuits in vehicles are used in environments which are very demanding in terms of the robustness and the reliability of the direction indictor circuit and the direction indicator per se. Direction indicators are subject to low and high temperatures, a high degree of humidity, to soiling and dirt of all types and to electromagnetic emissions. For an electronic circuit it is advantageous if, on the one hand, it is robust with respect to these stresses and, on the other hand, does not generate any stresses for other circuits. If an electronic circuit generates such stress, for example as a result of generating a large amount of heat or, for example, due to high electromagnetic emissions, then a high level of expenditure has to be made during operation to minimize this stress again at a different design level. A circuit which only has low electromagnetic emission has a high cost advantage for the user since the user can, for example, dispense with expensive filters. A further cost advantage can be achieved in that components are generally replaced by more cost-effective and robust components. At present, capacitors which are larger than 200 µF are used to supply direction indicator circuits. If the power consumption of the direction indictor circuit is reduced, a smaller and therefore more cost-effective capacitor can be used.

SUMMARY

A direction indicator circuit for controlling a direction indicator may include: a first terminal for connecting to a supply voltage terminal; a second terminal for connecting to a direction indicator switch and a lighting means; a third terminal for connecting to a capacitor; wherein the direction indicator circuit is designed to provide the lighting means with a current during an on state and with no current during an off state, wherein the duration of the on state and the duration of the off state are determined by a voltage at the capacitor; wherein the direction indicator circuit has a first and a second circuit, wherein the capacitor provides the supply voltage for the first and second circuits during the on state; wherein the current which flows through the first circuit has a negative temperature coefficient, and the current which flows through the second circuit has a positive temperature coefficient.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a direction indicator with a direction indicator circuit;

FIG. 2 shows a direction indicator with a direction indictor circuit;

FIG. 3 shows a flow chart relating to the sequence in a direction indictor circuit;

FIG. 4 shows signal profiles;

FIG. 5 shows a direction indicator circuit;

DESCRIPTION

Figure 6:
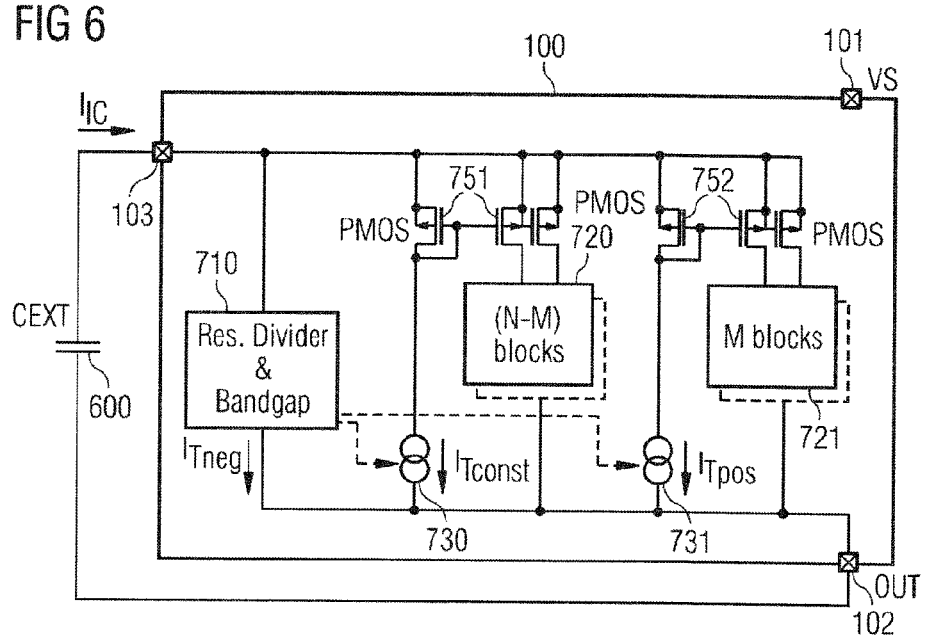
FIG. 6 shows an embodiment of a direction indictor circuit.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

FIG. 1 shows a direction indicator with a direction indictor circuit 100, a direction indictor switch 200 and a lighting means 300 of a direction indicator. The direction indicator circuit 100 is connected by a first terminal 101 to a supply voltage 500. A second terminal 102 of the direction indicator circuit is connected to the direction indicator switch 200. The direction indicator switch 200 is connected to the lighting means 300. The arrangement of the direction indicator switch 200 and of the lighting means 300 can be interchanged. A capacitor 600 is connected to the third terminal 103 of the direction indicator circuit 100. In this arrangement, the direction indictor circuit 100 replaces electromagnetic components. Owing to the conservative development of the vehicle industry it is often necessary for the electronic components which are intended to replace the electromechanical or mechanical components to comply with the specifications of the original components.

If the direction indicator switch 200 is off, i.e. open, and if the arrangement is in equilibrium, that is to say the direction indicator circuit has already been open for a long time, no current can flow through the arrangement. Since no current flows through this arrangement, the direction indictor circuit is also currentless, i.e. there is no supply voltage present at the direction indicator circuit. The lighting means 300 does not light up. In this state the total supply voltage is present at the direction indictor switch 200. The supply voltage is present between the supply voltage terminal 500 and a ground terminal 400. The supply voltage can be provided, for example, by a battery or a generator. The direction indictor switch 200 can be mounted, for example, on a dashboard of an automobile or on a handlebar of a motor cycle. Instead of a lighting means 300, a plurality of lighting means can also be used. The direction indicator switch 200 can be a multi-path switch which enables a direction indication.

If the direction indicator switch 200 is closed, a current can flow through the direction indictor circuit 100 and through the lighting means 300. In this starting phase, this current flows through the direction indicator circuit 100, wherein the direction indictor circuit 100 diverts this current, which flows into the first terminal 101, to the third terminal 103, with the result that the capacitor 600 is charged. The current is so high that the capacitor 600 is charged in an appropriate time, and so low that the lighting means 300 does not light up. During this starting phase in which the voltage at the capacitor rises, all the circuit components of a control circuit 120 of the direction indictor circuit 100 begin to operate. After all the circuit components of the control circuit 120 have begun to operate and the voltage at the capacitor 600 exceeds an upper threshold, the direction indictor circuit ends the starting phase and goes into an on state. The starting phase should be terminated within 50 ms.

The direction indictor circuit 100 has a switch 110. This switch 110 may be embodied, for example, as a high side switch, wherein this high side switch may be embodied as an NMOS. The switch 110 may, for example, also be embodied as a switch 110 using GaN technology or SiC technology. If the direction indictor arrangement is symmetrical along the horizontal line, or the supply voltage terminal 500 and the ground terminal 400 are interchanged, the switch 110 may also be embodied as a low side switch. The switch 110 may be embodied as a PMOS using a fourth terminal.

During the on state, the switch 110 is closed. Since both the switch 110 and the direction indicator switch 200 are then closed, the entire voltage drops across the lighting means 300, with the result that the lighting means 300 lights up. The voltage at the third terminal is, with respect to the ground terminal 400, in the on state above the voltage at the first terminal. That is to say the direction indicator circuit 100 is supplied using the capacitor 600. The capacitor 600 is thereby discharged. If the voltage at the capacitor 600 drops below a lower threshold, the direction indicator circuit ends the on state and goes into the off state.

During the off state, the switch 110 is open. Since the switch 110 is then open but the direction indicator switch 200 is closed, the entire voltage drops across the direction indicator switch 200, with the result that the lighting means 300 does not light up. The voltage at the third terminal is, with respect to the ground terminal 400, in the off state below the voltage at the first terminal. This means that the direction indicator circuit 100 can charge the capacitor 600. If the voltage at the capacitor exceeds the upper threshold, the direction indicator circuit ends the off state and goes into the on state.

FIG. 2 shows a detailed embodiment of the direction indicator circuit. The direction indicator circuit has a measuring circuit 120 which is designed to measure the current through the switch 110. The direction indicator circuit 100 has an evaluation and storage circuit 130 which is designed to evaluate and/or store measured values. The direction indicator circuit 100 has a clock generator 140 which is designed to generate a clock. The direction indicator circuit 100 has a logic circuit 160 which is designed to provide a bandgap voltage, to provide a reference current and to provide a logic which administers the on state, the off state and the starting phase. The direction indicator circuit has a supply circuit 150 which is designed to charge the capacitor 600 during the starting phase, discharge the capacitor during the on state, charge the capacitor during the off state, provide at least one supply voltage for the measuring circuit 120, the evaluation and storage circuit 130, the clock generator 140 and the logic circuit 160, and to provide at least one bias current for at least one of the measurement circuit 120, the evaluation and storage circuit 130, the clock generator 140 and the logic circuit 160.

FIG. 3 shows a flow chart of the sequence in a direction indicator circuit 100. In a first state 901, the direction indicator switch 200, SW, is off. The switch of the direction indicator circuit 110, DMOS, is off. No current flows into the capacitor 600. In a second state 902, the direction indicator switch 200 SW is closed, i.e. on. The capacitor 600 is charged with a current of 5 mA. In a third state 903, the direction indicator switch 200, SW is closed, i.e. on. If the capacitor voltage reaches an upper threshold of, for example 6.5V, the switch 110, DMOS is closed, or switched on. Since the greater part of the voltage of the supply voltage terminal 500 now drops across the lighting means 300, the voltage at the third terminal is higher than the voltage at the supply voltage terminal 500. The direction indicator circuit 100 is then supplied with voltage by the capacitor 600. In order to supply the direction indicator circuit 100, a discharge current 100 µA is extracted from the capacitor 600, i.e. the capacitor is discharged. This discharge current must be set precisely since the duration of the on state is determined by means of this current and a further threshold which will be explained below. The duration of the on state is defined by the size of the capacitor 600, the magnitude of the discharge current and the magnitude of the further threshold. In a fourth state 904, the direction indicator switch 200, SW is closed, i.e. on. If the capacitor voltage reaches a first lower threshold of, for example, 5.25 V, the current of the switch 110 is checked. If the current of the switch 110 DMOS is lower than a first current threshold, the direction indicator circuit 100 changes into the off state or into a fifth state 905. In this fifth state 905, the switch 110, DMOS is opened or off. The capacitor is charged with a current of 100 µA. If the voltage at the capacitor 600 reaches the upper threshold again, the direction indicator circuit 100 goes into the third state 903 again. The fifth state 905 can be reached, for example, if one of at least two lighting means 300 is defective, with the result that a current flows which is lower than an expected current. In this case, the direction indicator will flash with a higher frequency in order to indicate to a user that a defect is present. If the current of the switch 110 DMOS is larger during the fourth state 904 than a first current threshold, the direction indicator circuit changes into a sixth state 906. In this sixth state 906, the switch 110 DMOS is closed, i.e. on. The capacitor is discharged with a current of 100 µA. A seventh state is reached if the capacitor voltage reaches a second lower threshold of, for example, 4 V. In this seventh state 907, the switch 110 DMOS is closed, or on. The capacitor is discharged with a current of 100 µA. If the voltage at the capacitor 600 reaches the upper threshold again, the direction indicator circuit 100 goes into the third state 903 again. The seventh state 907 can be reached, for example, if none of at least one lighting means 300 is defective, with the result that a current flows which is as high as an expected current. In this case, the direction indicator is to flash with a normal frequency in order to indicate to a user that there is no defect.

The values of the thresholds are only exemplary values which may vary from one direction indicator circuit 100 to another direction indicator circuit 100. A change in the manufacturing technology of the direction indicator circuit 100 can lead to adaptation of these thresholds.

FIG. 4 shows signal profiles. The first signal from the top shows the state of the direction indicator switch 200. The second signal from the top shows the voltage at the second terminal 102. The third signal from the top shows the voltage at the third terminal 103, or the voltage of the capacitor 600. The fourth signal from the top shows the charge current and discharge current. The direction indicator circuit begins to operate when the direction indicator switch 200 is closed 1030.

Starting from this time 1030, the switch 110 is firstly still open and the capacitor is charged with a high current during the starting phase until an upper threshold is reached. Then, the direction indicator circuit periodically passes through the on state and the off state. The capacitor is charged with a charge current during the off state. The duration of the off state is determined by the charging of the capacitor. During the on state the capacitor is discharged with a discharge current. The duration of the on state is determined by the discharging of the capacitor. This has the advantage that only relatively small currents flow during the off state and during the on state. A further advantage is that no charge pulses give rise to large electromagnetic emissions. This has the further advantage that both the duration of the on state and the duration of the off state are determined by currents which differ only in terms of their sign.

FIG. 5 shows a direction indicator circuit. The direction indicator circuit 100 has a first terminal 101, a second terminal 102 and a third terminal 103. A capacitor 600 is connected to the second terminal 102 and third terminal 103. The direction indicator circuit has a first circuit block 710, a first further circuit block, a first power source 730 and a current mirror 751. These components are coupled, for their supply, to the second terminal 102 and third terminal 103. The first circuit block 710 has a voltage divider and a bandgap circuit which is designed to measure the voltage of the capacitor 600. The voltage divider and the bandgap circuit of the first circuit block 710 discharge the capacitor with a low current. The voltage divider and the bandgap circuit have a temperature dependence. The temperature coefficient of the first circuit block 710 can be negative, for example. The current of the first power source 730 can be derived, for example, from the bandgap circuit. The current of the first power source 730 can be derived in such a way that the current does not have a temperature dependence. The current then has a temperature coefficient of 0. The first further circuit block 720 can be supplied using a current mirror 751. The first further circuit block 720 therefore also has a temperature coefficient of 0. The current of the first power source 730 and the current flowing through the first further circuit block 720 can be selected in such a way that the entire current of the direction indicator circuit 100 has a temperature coefficient which is negligible.

FIG. 6 shows an embodiment of a direction indicator circuit 100. This embodiment of the direction indicator circuit 100 differs from the direction indicator circuit in FIG. 5 in that the embodiment of the direction indicator circuit 100 has a second power source 731, a second further circuit block 721 and a further current mirror 752. The current of the second power source 731 may be derived in such a way that the current has a positive temperature dependence. The current then has a positive temperature coefficient. The current of the second power source 731 can be selected in such a way that the current of the second power source 731 is essentially as high as the current through the first circuit block 710. As a result, the negative temperature coefficient of the current through the first circuit block 710 can be compensated, with the result that the temperature coefficient of both currents is essentially 0. This has the particular advantage that a particularly large value no longer has to be selected for the current of the first power source 730. The current of the first power source 730 and of the second power source 731 can then be selected within the customary scope of, for example, 0.1 to 10 µA. The total power consumption of this embodiment can be in the range from approximately 40 to 100 µA. The power consumption of this embodiment is therefore significantly smaller than the power consumption of the direction indicator circuit 100 shown in FIG. 5.

Figure 7:
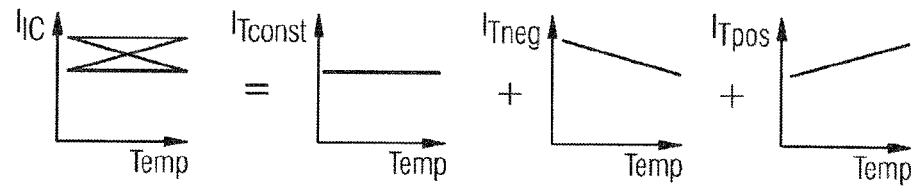
FIG. 7 shows signal profiles plotted against the temperature.

FIG. 7 shows the qualitative effect of the superimposition of in each case one negative, one neutral and one positive temperature coefficient on the currents of the circuit blocks.

Figure 8:
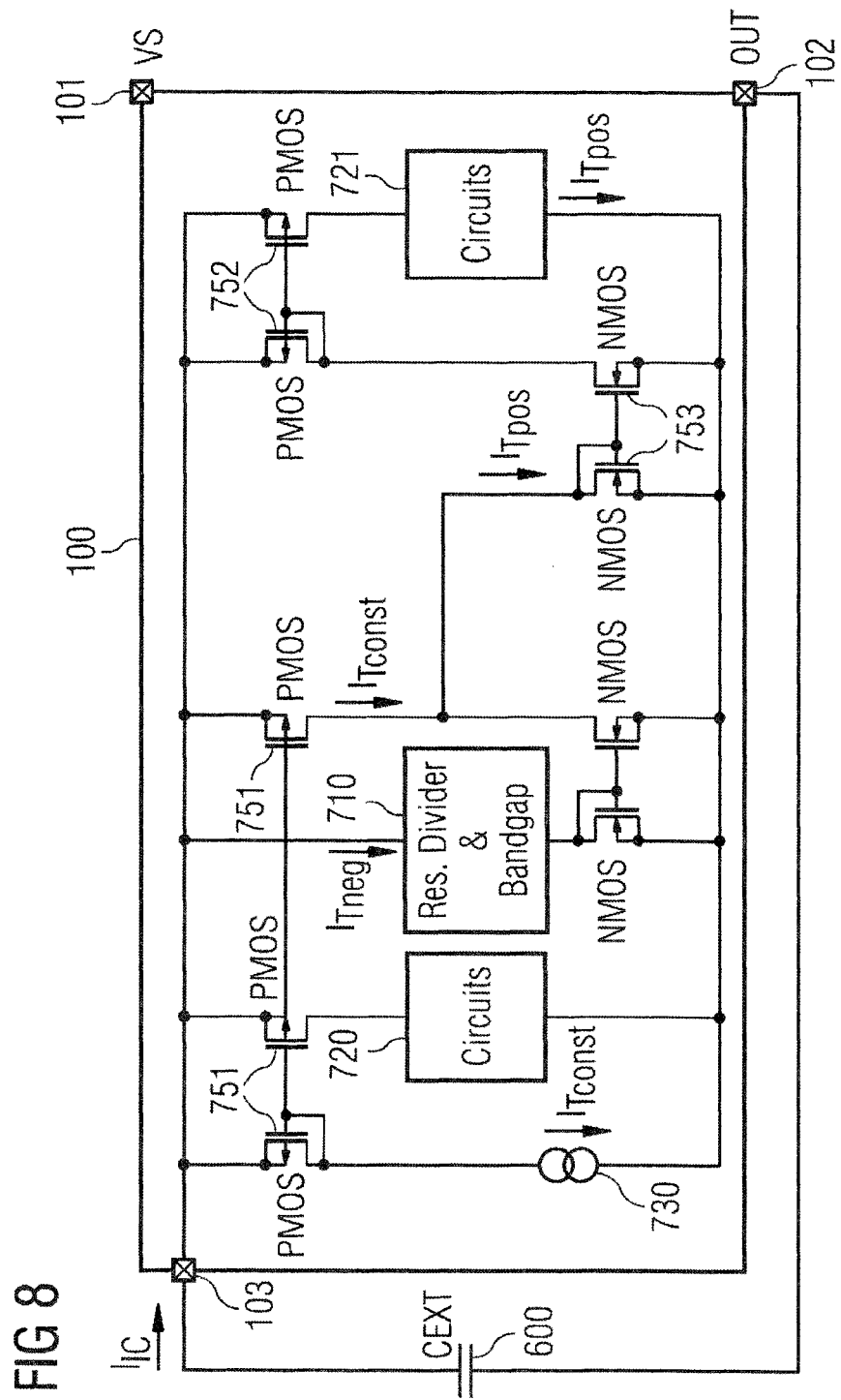
FIG. 8 shows a further embodiment of a direction indicator circuit.

FIG. 8 shows a further embodiment of a direction indicator circuit 100. The embodiment in FIG. 8 differs from the embodiment in FIG. 6 in that the current with a positive temperature coefficient is not selected by means of the second power source 731 but rather is formed by a difference-forming means in the direction indicator circuit 100 in such a way that the current is substantially compensated with the negative temperature coefficient.

Figure 9:
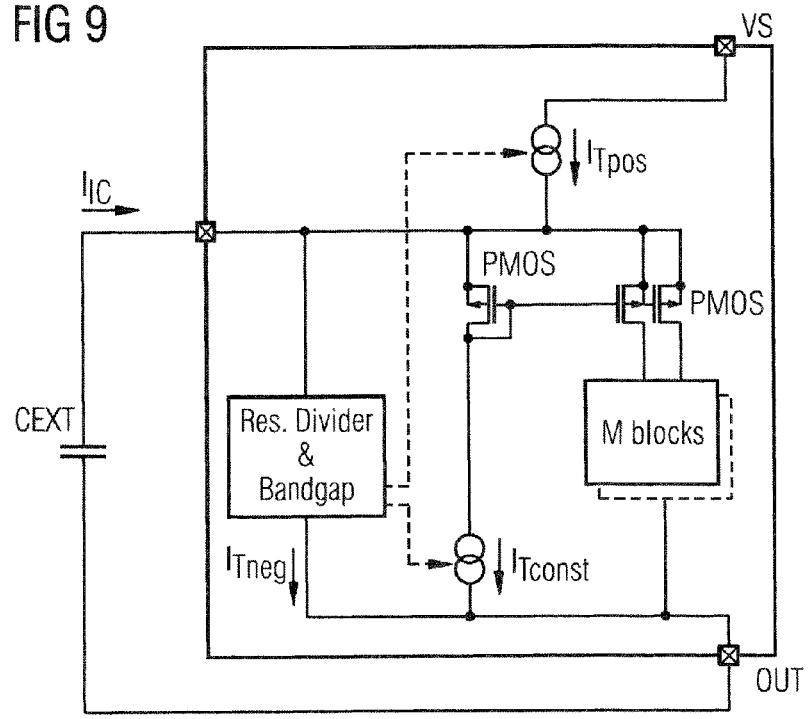
FIG. 9 shows a further embodiment of a direction indicator circuit.
Figure 10:
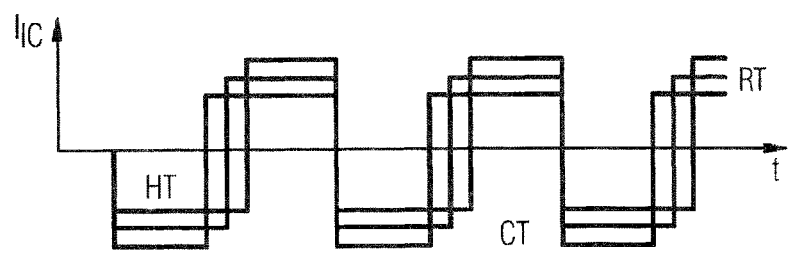
FIG. 10 shows signal profiles.

FIG. 9 shows a further embodiment of a direction indicator circuit 100, and FIG. 10 shows signal profiles.

Various embodiments provide a direction indicator circuit for which a more cost-effective capacitor for supplying power is sufficient.

A simple semiconductor circuit is used as the direction indictor circuit, which semiconductor circuit only has to have three terminals, one terminal for connecting a supply voltage, one terminal for connecting a vehicle ground or a ground terminal of the vehicle. A third terminal serves to connect a capacitor. This capacitor fulfils two functions: on the one hand this capacitor serves to supply voltage to the direction indicator circuit, and on the other hand it serves as a capacitor for implementing an oscillator using the direction indictor circuit. Direction indicator circuits have a high side switch which in an on state provides a current for the lighting means. During the on state, the voltages within the direction indictor circuit such as, for example, the gate voltage of the high side switch, are higher than the supply voltage. The connected capacitor therefore performs the function of a boot strap capacitor. During the on state, the connected capacitor is discharged. During an off state, the voltages within the direction indicator circuit, such as, for example, the gate voltage of the high side switch, are lower than the supply voltage. During the off state, the connected capacitor is charged. By using these charging and discharging times it is possible to define the frequency of the direction indicator circuit and of the direction indicator device per se. The direction indicator circuit is activated by the direction indicator switch. If the direction indicator switch is closed or at a low impedance, a flow of current through the direction indicator circuit and through the direction indictor lighting means becomes possible. The direction indicator circuit firstly charges the capacitor. As soon as the capacitor is charged, the direction indictor circuit starts. After the start of the direction indictor circuit, it closes its internal switch and therefore permits a flow of current through the lighting means of the direction indicator. The direction indicator circuit opens and closes the internal switch with a frequency of 1.5 Hz.

If, for example in order to save costs, the size of the capacitor is reduced, it is possible, for example, to reduce the power consumption of the direction indicator circuit. In this context, the discharge current should be constant over a wide temperature range so that the direction indicator frequency also remains constant over this wide temperature range. So that the direction indicator frequency remains constant plotted against the temperature, the capacitor should be discharged with a current which is constant over the temperature range since the direction indicator frequency is defined, inter alia, by the size of the capacitor, the discharge current and an upper and a lower threshold. Furthermore, the capacitor should also be charged with a current which is constant over the temperature range since the direction indicator frequency is defined, inter alia, by the size of the capacitor, the charge current and a lower and an upper threshold. The frequency can be defined by the size of the capacitor, the discharge current, the charge current and an upper and a lower threshold. If a bandgap circuit is used in the direction indicator circuit to provide a temperature-constant voltage and a voltage divider is used to measure the thresholds or other voltages, there is at least one circuit which has a temperature dependence. The direction indictor circuit can have, for discharging the capacitor, a temperature-stable power source whose current is greater than the power consumption of the rest of the direction indictor circuit. This measure allows the temperature dependence of the total power consumption to be ignored. If, for example, the direction indictor circuit has a power consumption of 10 µA and if the current of the temperature-stable power source is set to 1 mA, the resulting error is approximately 1%. In the case of a discharge current of 1 mA and a direction indicator frequency of 1.5 Hz, the capacitor requires a capacitance of approximately 220 µF.

The direction indicator circuit for controlling a direction indicator in a vehicle includes a first terminal for connecting to a supply voltage terminal, a second terminal for connecting to a direction indicator switch and a lighting means, and a third terminal for connecting to a capacitor. The direction indictor circuit is designed to provide the lighting means with a current during an on state and with no current during an off state. The duration of the on state and the duration of the off state are determined by a voltage at the capacitor (600). The direction indicator circuit has a first and a second circuit, wherein the capacitor provides a supply voltage for the first and second circuits during the on state. The current which flows through the first circuit has a negative temperature coefficient, and the current which flows through the second circuit has a positive temperature coefficient.

The capacitor can be discharged essentially constantly during the on state and can be charged essentially constantly during the off state.

The sum of the currents which flow through the first and second circuits has a temperature coefficient of essentially 0.

A regulating circuit can regulate the current which flows through the second circuit in such a way that the sum of the currents which flow through the first and second circuits has a temperature coefficient of essentially 0.

The currents which flow through the first and second circuits can be defined in such a way that the sum of these currents has a temperature coefficient of essentially 0.

If the capacitor is discharged to such an extent that the direction indicator circuit is operational, the direction indictor circuit cannot readily determine, due to its simple and cost-effective design, whether the switch is open or closed. The direction indictor circuit instead behaves as if the switch were closed, since under normal circumstances this constitutes a requirement for operation and therefore a requirement for a charged capacitor. An operational voltage is made available to the direction indictor circuit by means of the charged capacitor, with the result that the direction indicator circuit is operational. If the direction indictor circuit is operational, the internal switch is opened and closed periodically. During the on state, the switch is closed and the external capacitor is discharged. The duration of the on state and the duration of the off state are determined essentially by the size of the external capacitor. During the on state, the switch is closed, with the result that a current can flow through the lighting means. The voltage at the capacitor is higher than the supply voltage, with the result that the direction indictor circuit is supplied by the capacitor. The direction indictor circuit is configured in such a way that the capacitor is discharged by a constant current. If the current is constant during the discharging, the duration of the on state is also constant if the on state starts at an upper threshold and ends at a lower threshold. During the off state, the switch is opened, with the result that no current can flow through the lighting means. The voltage at the capacitor is lower than the supply voltage, with the result that the capacitor can be charged again. The direction indictor circuit is supplied by the supply voltage terminal. The direction indictor circuit is configured in such a way that the capacitor is then charged by means of a constant current. If the current is constant during the charging, the duration of the off state is also constant if the off state starts at a lower threshold and ends at an upper threshold. A particular advantage obtained by means of this procedure is that no hard edges occur since only a soft transition from a charging process to a discharging process occurs. If, for example, the charge current and discharge current are of equal magnitude and have a value of 100 µA, the change in current is merely 200 µA. If, for example, the capacitor is charged with pulses, the changes in current are significantly larger and therefore the electromagnetic emission is also substantially larger. A further particular advantage obtained is that both the on state and the off state are implemented in a similar way and charging pulses do not disrupt the determination of the duration either in the on state or in the off state.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A direction indicator circuit for controlling a direction indicator in a vehicle, the direction indicator circuit comprising:
- a first terminal for connecting to a supply voltage terminal;
- a second terminal for connecting to a direction indicator switch and a lighting means;
- a third terminal for connecting to a capacitor;
- wherein the direction indicator circuit is designed to provide the lighting means with a current during an on state and with no current during an off state,
- wherein the duration of the on state and the duration of the off state are determined by a voltage at the capacitor;
- wherein the direction indicator circuit has a first and a second circuit,
- wherein the capacitor provides the supply voltage for the first and second circuits during the on state;
- wherein the current which flows through the first circuit has a negative temperature coefficient, and
- the current which flows through the second circuit has a positive temperature coefficient,
- wherein the second circuit comprises a power source,
- wherein the current of said power source is derived in such a way that the current has a positive temperature dependence.

2. The direction indicator circuit of claim 1, wherein the sum of the currents which flow through the first and second circuits has a temperature coefficient of essentially 0.

3. The direction indicator circuit of claim 1, wherein a regulating circuit regulates the current which flows through the second circuit in such a way that the sum of the currents which flow through the first and second circuits has a temperature coefficient of essentially 0.

4. The direction indicator circuit of claim 1, wherein the currents which flow through the first and second circuits are defined in such a way that the sum of these currents has a temperature coefficient of essentially 0.

* * * * *